United States Patent [19]

Blonder

[11] Patent Number: 5,267,077
[45] Date of Patent: Nov. 30, 1993

[54] SPHERICAL MULTICOMPONENT OPTICAL ISOLATOR

[75] Inventor: Greg E. Blonder, Summit, N.J.

[73] Assignee: AT&T Bell Laboratories, Murray Hill, N.J.

[21] Appl. No.: 609,486

[22] Filed: Nov. 5, 1990

[51] Int. Cl.$^5$ .......................... G02B 5/30; G02F 1/09
[52] U.S. Cl. ................................... 359/280; 359/282; 359/484; 372/703; 385/11; 385/35
[58] Field of Search .............. 359/483, 484, 485, 501, 359/652, 664, 280, 282, 283; 372/703; 385/11, 35, 6

[56] References Cited

U.S. PATENT DOCUMENTS

| | | | |
|---|---|---|---|
| 3,897,136 | 7/1975 | Bryngdahl | 359/501 |
| 4,257,672 | 3/1981 | Balliet | 350/96.17 |
| 4,557,566 | 12/1985 | Kikuchi et al. | 350/413 |
| 4,735,489 | 4/1988 | Tolksdorf et al. | 350/377 |

FOREIGN PATENT DOCUMENTS

| | | | |
|---|---|---|---|
| 61-132925 | 6/1986 | Japan | 359/501 |
| 2-176621 | 7/1990 | Japan | 359/501 |
| 2-201314 | 8/1990 | Japan | 372/703 |

OTHER PUBLICATIONS

Shiraishi et al; "Cascaded Optical Isolator Configuration Having High Isolation Characteristics Over a Wide Temperature and Wavelength Range"; Optics Letters; vol. 12; No. 7/Jul. 1987 pp. 462-464.

Primary Examiner—Bruce Y. Arnold
Assistant Examiner—R. D. Shafer
Attorney, Agent, or Firm—Wendy W. Koba

[57] ABSTRACT

A spherical multicomponent optical isolator having a first spherical segment lensing region, including a base, a second spherical segment lensing region, including a base, a first polarizer attached to the base of the first segment lensing region, a second polarizer attached to the base of the second spherical segment lensing region and A Faraday rotator disposed between the first and second polarizers, wherein the combination of the first and second spherical segments, the first and second polarizers and the Faraday rotator forms the spherical optical isolator having a spherical outer surface.

6 Claims, 3 Drawing Sheets

SPHERICAL MULTICOMPONENT OPTICAL ISOLATOR

BACKGROUND OF THE INVENTION

1. Field of the Invention

The present invention relates to multicomponent optical devices and, more particularly, to various arrangements including regions with different optical properties such that a single device may perform a number of different optical functions. A manufacturing technique related to batch fabrication of such devices is also disclosed.

2. Description of the Prior Art

Many optical communication systems require various passive optical components such as, for example, lenses, optical isolators, dichroic filters, and polarization splitters. Lenses are used to couple light between active devices (e.g., lasers or LEDs) and optical fibers. These lenses have many different geometries, as indicated by the common use of spherical lenses and cylindrical graded index lenses. Optical isolators may be used in applications such as high bit rate transmitters and optical amplifiers to prevent reflected signals from re-entering active semiconductor optical devices such as lasers. Dichroic filters are often utilized in multiplexer/demultiplexer schemes to separate the various operating wavelengths and to increase the capacity of the communication system. Polarization beam splitters are used in coherent optical receivers which require polarization diversity to achieve data recovery. Many requirements for other passive optical components also exist.

Additionally, the packaging assembly processes for many lightwave devices include many time-consuming and expensive operations. For example, in most conventional lightwave communication systems, the multiplicity of passive optical components are individually mounted and aligned. The alignment operation becomes problematic in packages of relatively small size which necessitates extremely tight spaces between components. The reduction in package size additionally increases the need to reduce, where possible, the number of such components contained in a single package. Mechanical stability of the final package is another demand on the system design.

There exist in the optics art various spherical couplers which include a first spherical lens embedded within a second coupling component. U.S. Pat. No. 4,257,672 issued to L. Balliet on Mar. 24, 1981 discloses one such arrangement with a spherical core lens completely surrounded by a spherical shell. The index of refraction of the core is greater than that of the shell. The Balliet sphere is utilized to provide coupling between an LED and an optical fiber. In an alternative arrangement disclosed in U.S. Pat. No. 4,557,566 issued to K. Kikuchi et al. on Dec. 10, 1985, a spherical core is surrounded by a cladding which is half spherical and half cylindrical, forming a GRIN-spherical confocal lensing arrangement. These and other prior art designs are deemed to be relatively simple arrangements which may perform only the function of coupling the optical signal between an active optical device (e.g., laser, LED) and the transmitting fiber.

U.S. Pat. No. 4,753,489 issued to W. F. M. Tolksdorf et al. on Apr. 5, 1988 discloses an alternative spherical device particularly developed for rotating the plane of polarization of linearly polarized light passing therethrough. In particular, the Tolksdorf et al. device comprises a ball lens made from magnetic crystalline material preferentially magnetized in the direction of light transmission, where the ball lens consists of two domes of magnetic garnet material whose basal planes are oriented parallel to one another and perpendicular to the direction of light transmission, with a spherical member between the domes consisting of optically transparent non-magnetic garnet material. The sphere can be rotated to adjust the effective thickness of the magnetic material, thus providing the ability to match the magnetooptical rotation to the wavelength of the light signal propagating therethrough. In fabrication, equally thick layers of magnetic garnet material are epitaxially deposited on the major surfaces of a substrate consisting of optically transparent non-magnetic garnet material. The coated substrate is then sawed into cubes, and the cubes are ground to form spheres. The Tolksdorf et al. process is considered to contain several drawbacks. For example, there is considerable difficulty in growing epitaxial layers on opposite major surfaces of a substrate such that the epitaxial layers are equally thick. Additionally, epitaxial growth is known to be a thickness-limited process, due to slow growth rates and relatively large strains from mismatched lattice sizes. Therefore, the ability to form spherical polarization rotators of the relatively large size (as compared to integrated circuits utilizing epitaxial growth techniques) required for most optical applications is questionable in the Tolksdorf et al. process. Further, the type of optical device which may be fabricated is limited to those which require only the epitaxial deposition of similar materials. Additionally, the actual device structure as disclosed by Tolksdorf et al. may suffer performance limitations in that the magnetic material performing the desired rotation is formed in a manner such that the magnetic material performing the desired rotation is formed in a manner such that the magnetic domes are not uniformly thick. Therefore, a linearly polarized signal passing through the central axis (indicated by numeral 9 in the figure), where the dome thickness is maximum, would experience a greater rotation than those signals traveling in parallel paths, displaced from axis 9 where the dome thickness is smaller. Lastly, the device as disclosed by Tolksdorf et al. requred additional discrete, external components (i.e., polarizers) in order to perform the complete optical isolation function.

In light of the above, therefore, a need remains in the prior art for a means of reducing the size, cost, alignment difficulties, fabrication problems and various other limitations in lightwave communication arrangements which require a number of separate optical functions.

SUMMARY OF THE INVENTION

These and other concerns of the industry are addressed by the present invention which relates to multicomponent optical devices and, more particularly, to various devices comprising a body with a spherical surface through which light propagates, the body including regions with different optical properties such that a single sphere may perform a number of different optical functions. The ability to include a number of different optical functions (such as, for example, isolation, wavelength multiplexing/demultiplexing, notch filtering, or polarization splitting) results in significantly reducing the number of individual components utilized in most conventional arrangements. Further, the use of a sphere allows for the end domed regions of the body to function as a pair of lenses. The spherical surface also reduces the complexity of aligning the body to the optical communication signal path (i.e., the sphere may simply be inserted in a V-groove formed in the substrate supporting optical communication paths).

In an exemplary embodiment of the present invention, a multicomponent sphere may comprise a first spherical segment region with a first optical property and a second spherical segment region with a second (i.e., different) optical property (or magnitude of property, such as two different indicies of refraction), with an essentially planar interface formed by the adjoining bases of each segment. An optical signal passing through the sphere will thus be modified as a function of the difference in optical properties. For example, the first region may comprise a spherical glass segment with a first refractive index $n_1$, and the second region may comprise a spherical glass segment with a second refractive index $n_2$, where $n_1 > n_2$. The exemplary multicomponent sphere will thus perform as a mode transformer capable of coupling a signal between a first device with a large NA (for example, a laser) into a second device with a relatively small NA (for example, an optical fiber).

In an alternative embodiment of the present invention, a multicomponent device may comprise a number of different regions including a first lens region, an intermediate optical component (or components) region and a second lens region, the intermediate component(s) being disposed between the first and second lens regions. An optical signal impinging the multicomponent device would therefore pass through the first lens and be focused into the optical component(s) and exit through either the first or second lens, depending upon the parameters of the signal and the properties of the optical component(s). The regions may be attached using bonding material disposed away from the optical signal path. The bonding material may be disposed in any suitable pattern as, for example, a series of separate segments, or as a continuous annular ring. The use of an annular ring of water impermeable bonding material having the additional advantage of providing a hermetic seal for the final device structure.

It is an advantage of the present invention that the multicomponent devices may be produced using a batch process such that many essentially identical spheres may be simultaneously formed. In one exemplary fabrication process, relatively large sheets of the different materials utilized to form the various optical regions are attached to one another to form a laminated structure. The laminate is then diced to form a large number of cubes with the desired optical properties. The cubes are then rounded (e.g., ground, polished) into the desired spherical shape.

Other and further advantages of the present invention will become apparent during the course of the following discussion and by reference to the accompanying drawings.

BRIEF DESCRIPTION OF THE DRAWING

Referring now to the drawings, where like numerals represent like quantities in several views.

DETAILED DESCRIPTION

Figure 1:
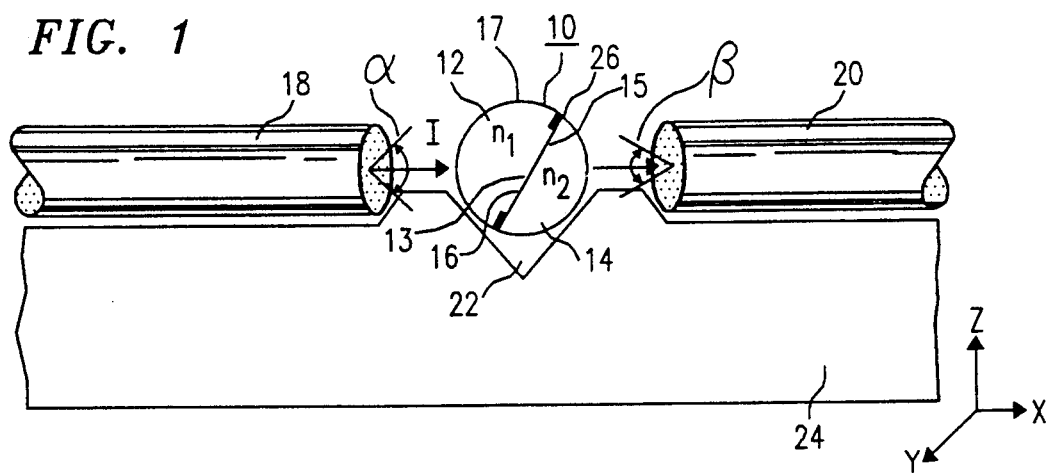
FIG. 1 illustrates an exemplary mode transforming optical sphere formed in accordance with the present invention.

FIG. 1 illustrates an exemplary lightwave system including a relatively simple multicomponent optical sphere 10 formed in accordance with the present invention. Sphere 10, which may be utilized as a mode transformer, includes a first spherical segment region 12 with an index of refraction $n_1$ and a second spherical segment region 14 with an index of refraction $n_2$, where $n_1 > n_2$. A planar interface 16 is formed at the intersection of bases 13 and 15 of regions 12 and 14, respectively. Interface 16 may be antireflection (AR)-coated to reduce reflections. The outer surface 17 of sphere 10 may also be AR-coated to reduce reflections. Sphere 10, as formed, may be used to focus an optical signal between a first component 18, such as a laser, waveguide or large NA optical fiber, and a second component 20, such as a small NA fiber. In particular, an optical signal I exits first component 18 with a relatively large beam angle $\alpha$ and impinges AR-coated first region 12. Signal I will converge, at a first rate, as it propagates through region 12. Since interface 16 is AR-coated, very little signal will be reflected, most entering second region 14. Signal I will thus converge, at a second (slower) rate, as it propagates through second region 14. Upon exiting sphere 10, optical signal I is focused into second component 20. As shown in FIG. 1, the beam entrance angle $\beta$ of second component 20 is less than angle $\alpha$ associated with first component 18. Therefore, the use of mode transformer 10 allows for a significant portion of the transmitted signal to be coupled into second component 20. The relative sizes of regions 12 and 14, and their respective refractive indicies, will determine the degree of mode conversion.

The simplicity of the spherical design allows for mode transformer 10 to be positioned within an etched groove (or pyramidal opening) 22 in a support substrate 24 holding the remaining optical components (e.g., fibers, waveguides, light sources). Misalignment between first component 18 and second component 20 may be compensated by rotating sphere 10 such that interface 16 is angled with respect to the optical signal path, as shown in FIG. 1. Such a method of providing beam steering does not require any x-y displacement of sphere 10, as is required in conventional multicomponent beam steering arrangements. Rotation of sphere 10 may also be used to prevent reflected signals from re-entering the incoming signal path, thus providing a degree of isolation between the input and output paths. In the case of isolation, components 18 and 20 may be intentionally offset to compensate for the off-axis beam leaving the sphere.

In fabrication, region 12 (which may comprise silica glass) is attached to region 14 (which may comprise silicon dioxide) with, for example, an adhesive such as a metal solder bond, anodic bond, thermo-compression seal, or epoxy. The adhesive may be attached to form an annular bond 26 removed from the optical signal path, since the bonding material may not be transparent at the transmission wavelength. Alternatively, localized regions of bonding material, instead of a complete annulus, may be used. As will be discussed in detail below, the use of an annular bond is especially attractive when it is desired to form a hermetic device.

Figure 2:
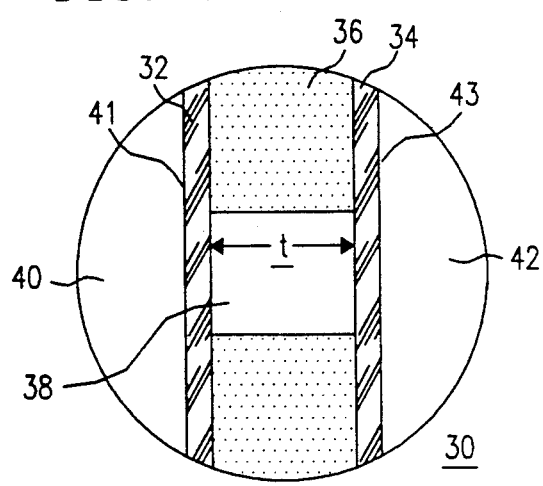
FIG. 2 illustrates an exemplary Fabry-Perot device formed in accordance with the present invention.
Figure 3:
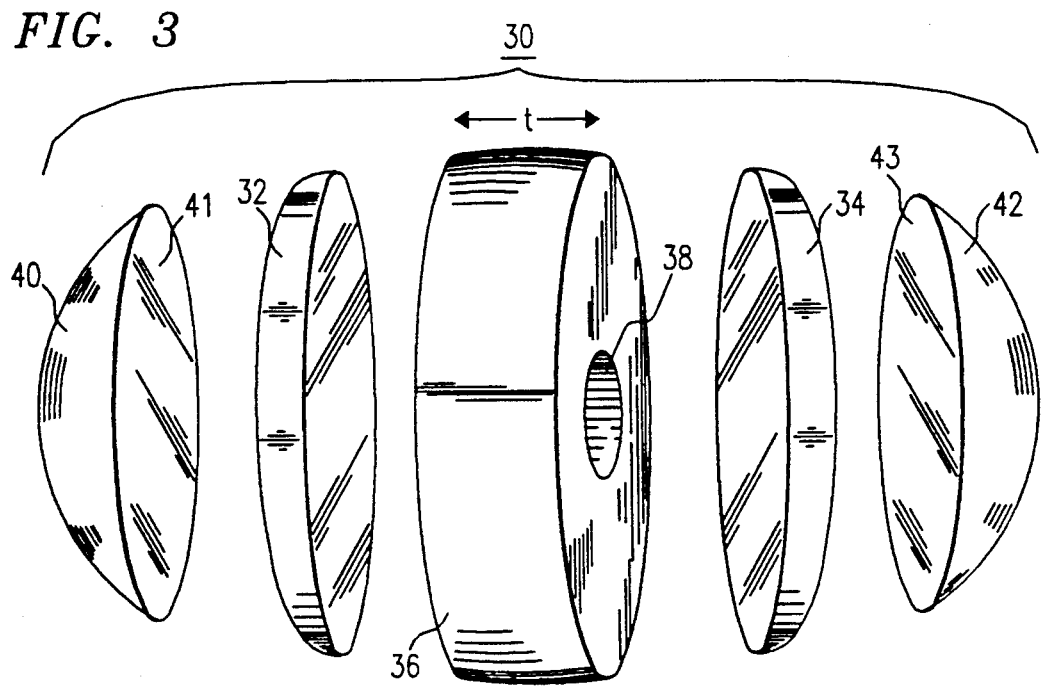
FIG. 3 illustrates, in an exploded view, the exemplary Fabry-Perot device of FIG. 2.

A Fabry-Perot device, formed using a multicomponent optical sphere 30, is illustrated in FIG. 2, with an exploded view in FIG. 3. Device 30 includes a pair of mirrors 32,34 with a spacer element 36 disposed therebetween. As shown, spacer 36 includes a central cavity 38 through which the optical signal will propagate back and forth between mirrors 32,34 (it is to be noted that cavity 38 is optional, depending upon the design of the filter). A pair of lenses 40, 42 formed of spherical segments, are positioned at the input and output of the Fabry-Perot device to provide the required coupling of the light signal into and out of the device. As shown in FIGS. 2 and 3, lens 40 is attached along its base 41 to mirror 32 and lens 42 is attached along its base 43 to mirror 34. All attached surfaces, for this and other devices described below, may be AR-coated to reduce reflections. In operation, the thickness t of spacer 36 is a factor in determining the wavelength of the signal exiting lens 42. As is well-known in the art, such an arrangement will thus perform as a resonant transmission filter (e.g., notch filter) at a predetermined wavelength.

Figure 4:
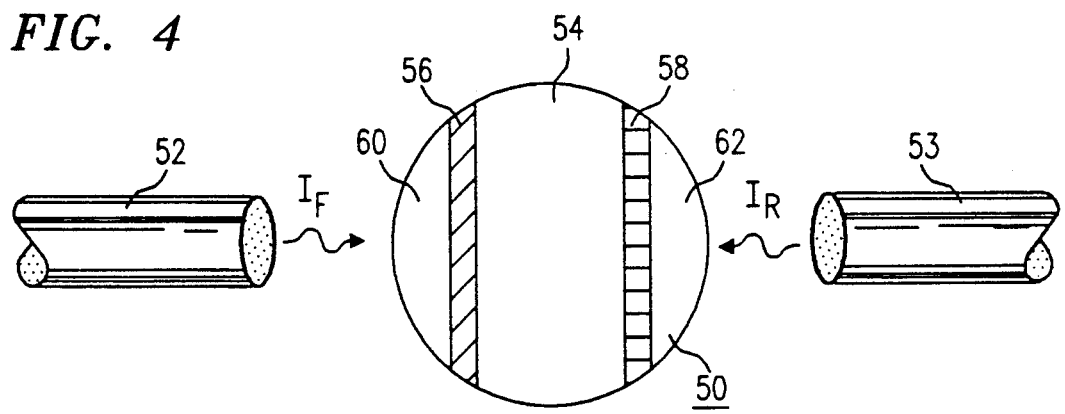
FIG. 4 illustrates an exemplary optical isolator formed in accordance with the present invention.

FIG. 4 illustrates a multicomponent spherical optical isolator 50 formed in accordance with the present invention. In general, isolator 50 functions to allow a forward direction optical signal $I_F$ from a source 52 to pass through isolator 50 and into a receiving element 53, while virtually preventing reflected signals $I_R$ originating at element 53 from re-entering source 52. Isolator 50 comprises a Faraday rotator material 54, with a pair of linear polarizers 56,58 disposed on either side thereof. As will be discussed hereinafter in association with FIG. 7, polarizers 56,58 may be formed as an integral part of Faraday rotator material 54. That is, the polarizers may comprise a series of grating lines etched into a coating on each major surface of material 54. Alternatively, a separate pair of polarizing sheets may be used. A pair of lenses 60,62 are attached as shown in FIG. 4 to polarizers 56 and 58, respectively. In operation, isolator 50 is surrounded by a permanent magnet (not shown) which induces a predetermined non-reciprocal angular rotation on optical signals passing through Faraday rotator material 54. Polarizers 56 and 58 are oriented so that signal $I_F$ will pass through unimpeded. Since the Faraday rotation is non-reciprocal, the reflected signal $I_R$ will be essentially blocked by polarizer 56 and substantially prevented form re-entering component 52. Advantageously, the spherical design of isolator 50 allows for the functions of coupling (60,62) and isolation (54,56,58) to be combined into a single, relatively small, inexpensive and self-aligned component. As with mode transforming sphere 10 of FIG. 1, isolator 50 may be rotated within its placement cavity (not shown) to provide beam steering. An exemplary fabrication process of an isolator will be described below in association with FIGS. 7-9.

Figure 5:
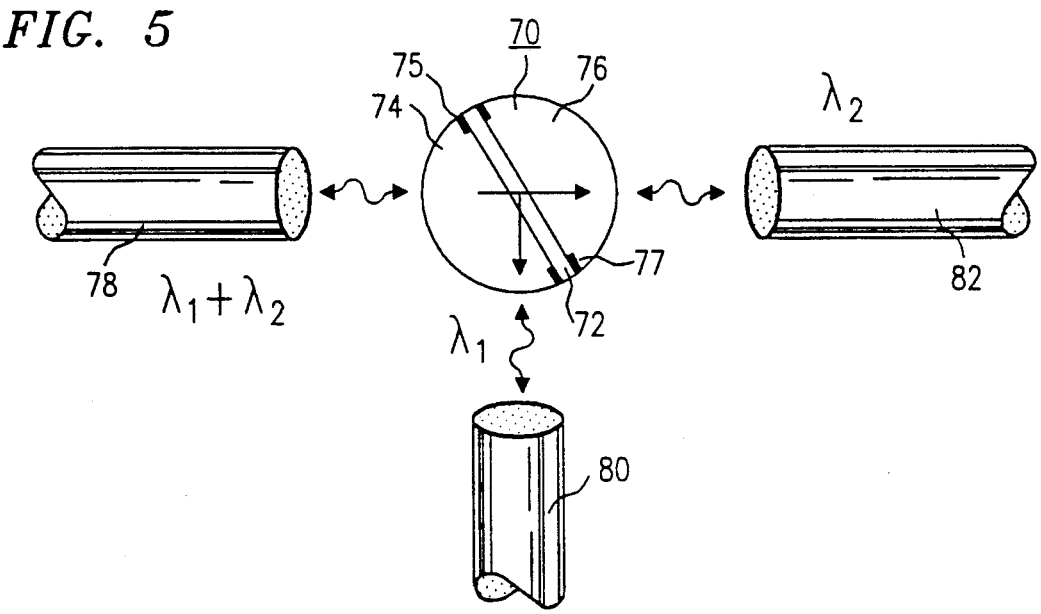
FIG. 5 illustrates an exemplary wavelength division multiplexer/demultiplexer formed in accordance with the present invention.

The component reduction and self-alignment advantages of the multicomponent sphere of the present invention are also found in a spherical multiplexer/demultiplexer (mux/demux) 70, illustrated in FIG. 5. Mux/demux 70 comprises a dichroic filter 72 disposed between a pair of glass lensing regions 74,76. Filter 72 may be attached to regions 74,76 using a pair of annular bonds 75 and 77, respectively. When operating as a demultiplexer, an incoming lightwave signal along a first waveguide 78 contains information at a first wavelength $\lambda_1$ and a second wavelength $\lambda_2$. Both wavelengths pass through lens 74 and are coupled into dichroic filter 72. In this particular example, filter 72 is designed to reflect wavelength $\lambda_1$ and pass wavelength $\lambda_2$. First wavelength $\lambda_1$ is thus redirected through another portion of first lens 74 and is coupled into a second waveguide 80. The signal at wavelength $\lambda_2$ will pass through filter 74 and second lens 76 and subsequently be coupled into a third waveguide 82. Wavelength mux/demux 70, a single sphere, thus replaces four separate components used in conventional mux/demux operations (three lenses, dichroic filter). Further, as mentioned above, the use of a single sphere results in a self-aligned arrangement.

Figure 6:
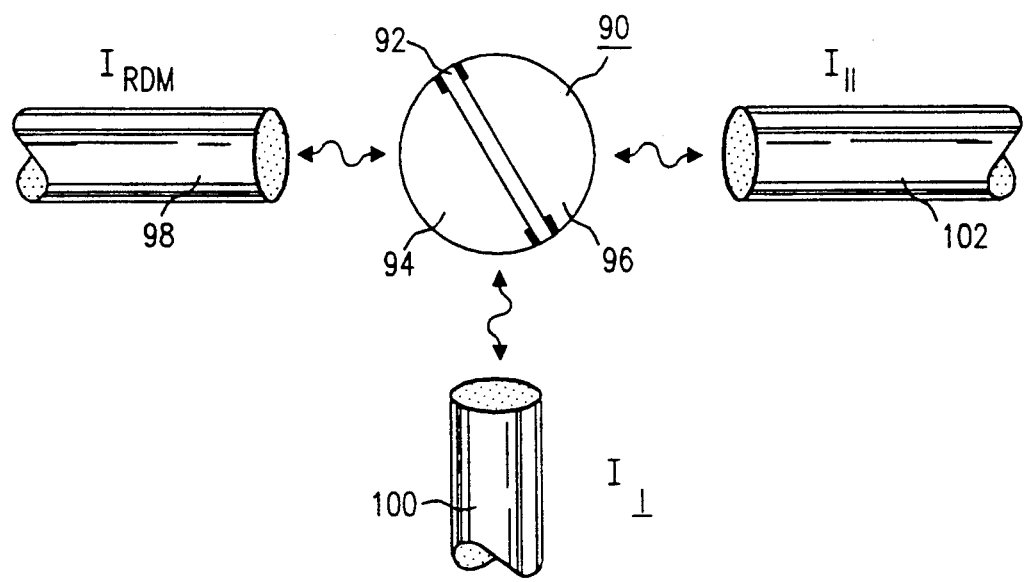
FIG. 6 illustrates an exemplary polarization splitter formed in accordance with the present invention.

A similar arrangement may be formed in accordance with the present invention to perform polarization splitting/combining, as shown in FIG. 6. In this case a polarization sphere 90 comprises a polarization film 92 disposed between a pair of lenses 94,96. An incoming signal of random polarization $I_{RDM}$ along a first waveguide 98 will propagate through first lens 94 and impinge polarization film 92. Film 92 functions to separate signal $I_{RDM}$ into known, orthogonal components, denoted $I_\perp$ and $I_\parallel$. The tilt of film 92 provides for first component $I_\perp$ to be redirected through first lens 94 and into a second waveguide 100. Second component $I_\perp$ will then pass through second lens 96 and be focused into a third waveguide 102.

As discussed above, an advantage of the multicomponent sphere arrangement of the present invention is the ability to simultaneously form a large number of essentially identical spheres using batch processing techniques. An exemplary batch fabrication process, associated with the formation of an optical isolator (such as that illustrated in FIG. 4) will be described below in association with FIGS. 7-9. It is to be understood that the following description is exemplary only, and there may exist many modifications to the fabrication process which will result in the formation of a multicomponent device of the present invention. Further, the following discussion is simplified, in terms of the number of like products which are formed from a single batch. During actual production, many hundreds of spheres may be simultaneously formed.

Figure 7:
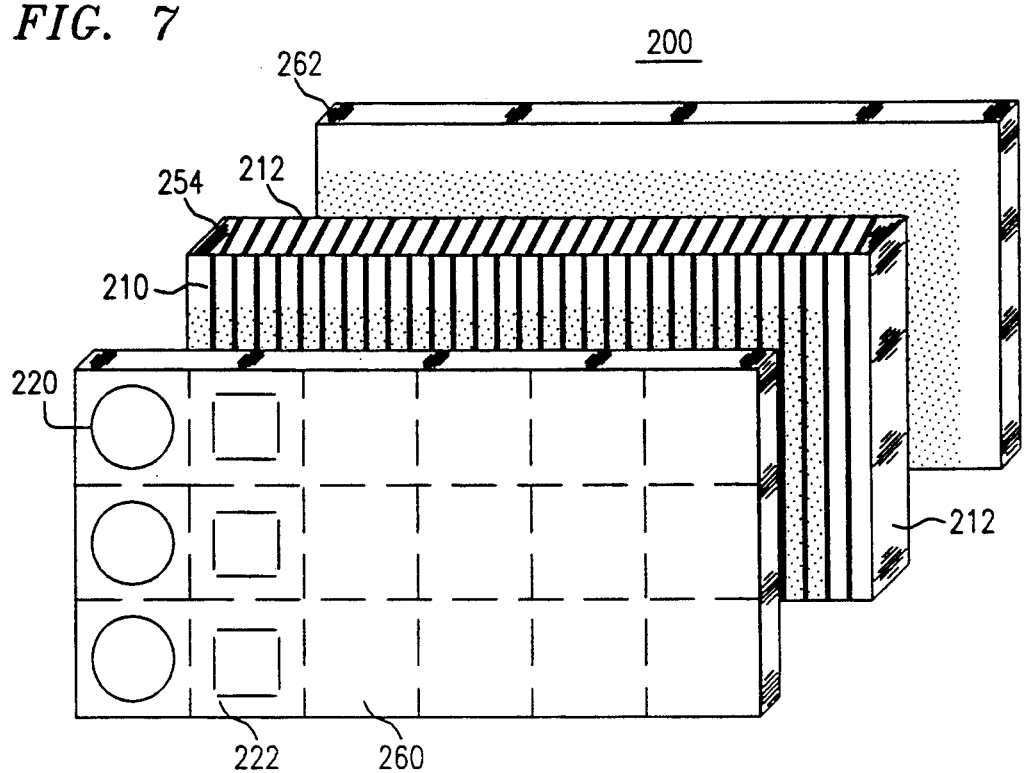
FIGS. 7-9 illustrate an exemplary batch fabrication process for an exemplary spherical optical isolator formed in accordance with the present invention.

Referring to FIG. 7, the fabrication process begins by attaching together relatively large sheets (for example, approximately four inches square) of material, which exhibit the desired optical properties, in the required order. For the isolator of FIG. 4, an exemplary laminate 200 includes a first sheet 260 of glass which may be used to form first lens 60. A sheet of Faraday rotator material 254, for example, a garnet film, is then attached to first sheet 260. In one exemplary fabrication technique, sheet 254 is first processed to form a number of properly spaced grating lines 210, 212 on either major surface thereof, grating lines 210, 212 being oriented so as to allow the desired optical signal to pass therethrough (grating lines 212 being illustrated in phantom). It is to be understood that grating lines 210,212 completely cover the front and back major surfaces of sheet 254. As shown in FIG. 7, the attachment of lens sheet 260 to rotator material 254 may be completed using a number of, for example, annular bonds 220 or bond segments 222 of an appropriate size to allow the unimpeded passage of the desired signal in the final product (see FIG. 4). As mentioned above, the bonding material may comprise a metal solder, epoxy, or any other suitable adhesive. Anodic bonding or thermo-compression seals may also be used to provide attachment. Although only a few bonds are shown, it is to be understood that a large number of such bonds are used to mate sheet 260 with sheet 254. Lastly, a second sheet of glass 262, used to form lens 62, is attached to the exposed major surface of Faraday rotator material 254, using a similar set of annular bonds or bond segments.

Advantageously, the use of annular bonds in accordance with the teachings of the present invention results in the formation of a hermetic device. Hermeticity can be a problem with such multilayer components, since the materials used to form the filters (e.g., sputtered or deposited glasses) are usually porous. The annular bonds used in this invention, comprising a water impermeable material, form a complete seal around the perimeter of the device, yielding a relatively simple and inexpensive method of providing hermeticity.

Figure 8:
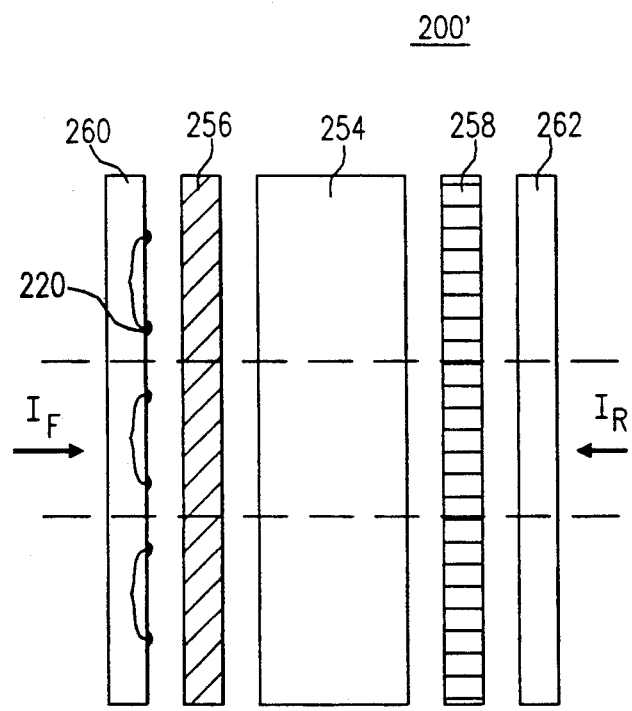

In an alternative fabrication process, the polarization components may comprise a pair of polarizing sheets 256,258, rather than being directly formed on the surfaces of rotator material 254. FIG. 8 illustrates a side view of this particular embodiment. In this process, the proper alignment of a pair of polarizing sheets 256,258 will result in essentially complete passage of a forward directed signal $I_F$ and essentially complete blockage of a reverse directed signal $I_R$, these signals being illustrated in a side view of laminate 200' in FIG. 8. The alignment condition may be advantageously realized in accordance with this alternative fabrication process by physically rotating either or both sheets 256 and 258, before the bonding material cures, until the desired conditions are achieved. Simply, a light source may be shown onto laminate 200 in the direction of $I_R$ and plates 256 and/or 258 rotated until little or no light exits first lens sheet 260. This type of batch formation thus allows for polarizers of essentially any orientation to be utilized, as long as they can be manipulated prior to adhesive curing to provide the desired optical isolation.

Figure 9:
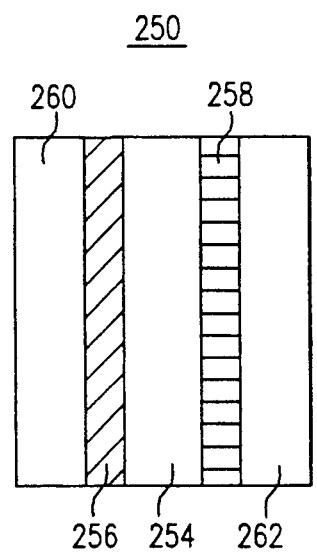

Subsequent to the attachment (and curing, if any), laminate 200 may be cut or diced along the dotted lines shown in FIGS. 7 and 8 to form a number of individual cubes, each cube thus comprising essentially identical optical properties. One such cube 250 is illustrated in FIG. 9. A spherical optical isolator 50 as illustrated in FIG. 4 may then be formed simply by grinding or polishing cube 250.

It is to be understood that the present invention is directed to the formation of relatively compact optical devices which include a number of separate optical components. In most cases, such devices will maintain their spherical shape as described and illustrated above. However, in certain applications it may be desirous to form a device including a relatively flat (i.e., non-spherical) portion. For example, if the multicomponent device is to be directly attached to a planar surface, it may be preferable for the device to also include such a surface.

Figure 10:
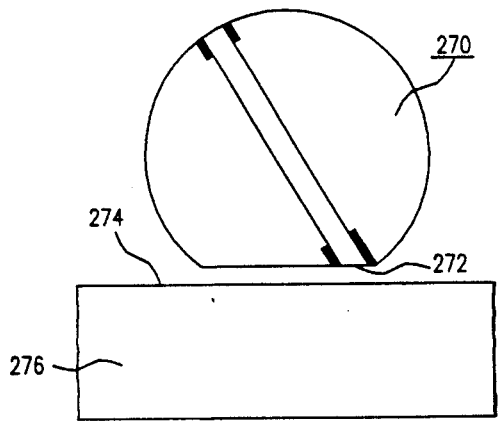
FIG. 10 illustrates an alternative multicomponent device of the present invention which includes a non-spherical portion.

FIG. 10 illustrates an exemplary wavelength division multiplexing device 270 of the present invention which has been further processed (e.g., polished, ground, or sawed) so as to include a relatively planar surface 272. Device 270 may then be attached along surface 272 to a relatively flat major surface 274 of a substrate 276. Other arrangements embodying devices with non-spherical shapes are possible and are considered to fall within the scope of the present invention.

I claim:

1. A multicomponent spherical optical device comprising
    a first spherical segment lensing region and a second spherical segment lensing region, each region including a base; and
    an intermediate optical component region comprising an optical isolator disposed between the first and second lensing regions so as to form a relatively planar interface with each base, wherein the optical isolator comprises
    a first linear polarizer disposed adjacent to the base of the first lensing region;
    a second linear polarizer disposed adjacent to the base of the second lensing region; and
    Faraday rotation material disposed between said first and second linear polarizers, the combination of said first and second segments with said intermediate optical component region forming a spherical optical device including a spherical outer surface.

2. A spherical optical isolator comprising
    a first spherical segment lensing region, including a base;
    a second spherical segment lensing region, including a base;
    first polarizing means attached to the base of said first spherical segment lensing region;
    second polarizing means attached to the base of said second spherical segment lensing region; and
    Faraday rotation means including opposing first and second major surfaces and disposed between said first and second polarizing means, wherein the combination of said first and second spherical segments, said first and second polarizing means, and said Faraday rotation means forms the spherical optical isolator including a spherical outer surface.

3. A spherical optical isolator as defined in claim 2 wherein the first and second polarizing means are formed directly on the first and second major surfaces of the Faraday rotation means.

4. A spherical optical isolator as defined in claim 3 wherein
    the first and second major surfaces of the Faraday rotation means each comprise an optically opaque coating; and
    the first and second polarizing means comprise a first and second plurality of grating lines etched into said optically opaque coatings.

5. A spherical optical isolator as defined in claim 2 wherein the first and second polarizing means comprise separate optical components attached to the first and second major surfaces of the Faraday rotation means.

6. A spherical optical isolator as defined in claim 2 wherein the Faraday rotation means comprises a garnet film.

* * * * *